United States Patent [19]

Takizawa et al.

[11] 3,931,128

[45] Jan. 6, 1976

[54] PROCESS FOR PREPARING COPOLYMER OF ACRYLONITRILE AND AROMATIC VINYL COMPOUND

[75] Inventors: Hidehiko Takizawa; Mitsuto Hisashige, both of Ichihara, Japan

[73] Assignee: Denki Kagaku Kogyo Kabushiki Kaisha, Tokyo, Japan

[22] Filed: Apr. 30, 1974

[21] Appl. No.: 465,655

[52] U.S. Cl............... 260/85.5 HC; 260/85.5 F
[51] Int. Cl.$^2$......................... C08F 220/44
[58] Field of Search.... 260/85.5 R, 85.5 HC, 85.5 F

[56] References Cited
UNITED STATES PATENTS

| | | | |
|---|---|---|---|
| 2,658,057 | 11/1953 | Park................ | 260/85.5 HC |
| 3,032,540 | 5/1962 | Ross et al........... | 260/85.5 R |
| 3,198,775 | 8/1965 | Delacretaz.......... | 260/85.5 R |
| 3,738,972 | 6/1973 | Moriyama et al..... | 260/85.5 R |
| 3,763,128 | 10/1973 | Lewis et al......... | 260/89.1 |

*Primary Examiner*—Joseph L. Schofer
*Assistant Examiner*—Maria S. Tungol
*Attorney, Agent, or Firm*—Sughrue, Rothwell, Mion, Zinn & Macpeak

[57] ABSTRACT

A process for preparing a copolymer of acrylonitrile and an aromatic vinyl compound such as styrene having a well-balanced combination of color, transparency and softening point by suspension polymerization in the presence of about 0.01 to 0.5% of an azo-type catalyst and about 0.005 to 0.2% of an organic peroxide catalyst free from a benzene ring, both based on the weight of the monomers where the polymerization is carried out at a temperature of 90° to 110°C until a monomer conversion of about 70% is obtained, and when the monomer conversion exceeds 70%, the polymerization is carried out at a temperature of 110° to 140°C.

5 Claims, No Drawings

PROCESS FOR PREPARING COPOLYMER OF ACRYLONITRILE AND AROMATIC VINYL COMPOUND

BACKGROUND OF THE INVENTION

1. Field of the Invention

This invention relates to a process for preparing a copolymer of acrylonitrile and an aromatic vinyl compound having a well-balanced combination of color, transparency and softening point.

2. Description of the Prior Art

According to the conventional polymerization process for preparing copolymers of acrylonitrile and an aromatic vinyl compound in which an azo-type catalyst alone is used, the color of the resulting copolymer is good, but even when the polymerization system is heated to a temperature of 135°C, the unreacted monomers do not decrease in quantity very much. As a result, the resulting copolymer has a low heat distortion temperature. When an organic peroxide catalyst is used alone, the resulting copolymer has a poor color.

SUMMARY OF THE INVENTION

The present invention provides a process for preparing a copolymer of acrylonitrile and an aromatic vinyl compound by suspension-polymerization using a specific catalyst system comprising an azo-type catalyst having a decomposition temperature of not less than 95°C and an organic peroxide catalyst which is free from a benzene ring and having a temperature, at which the organic peroxide catalyst exhibits a half life of 10 hours, of not less than 95°C, in the polymerization system; and with the polymerization being carried out at a temperature of 90° to 110°C until the conversion of the monomers reaches 70%, and being carried out at a temperature of 110° to 140°C when the monomer conversion exceeds 70%.

DETAILED DESCRIPTION OF THE INVENTION

Suitable azo-type catalysts which can be used in this invention include 1,1'-azobiscyclohexanitrile (hereinafter referred to as ACHN), 1,1'-azobiscycloheptanitrile (hereinafter referred to as ACHEN), 2,2'-azobis-(2,3,3-trimethylvaleronitrile), 2,2'-azobis-(2-thiocyanopropane), 2,2'-azobis-(2-nitropropane), and 2,2'-azobis-(2-methoxycarbonyl propane). ACHN and ACHEN are especially preferred as an azo-type catalyst for use in the invention.

Examples of organic peroxide catalysts which can be used in this invention include ditertiary butyl peroxide, tertiary butyl peroxy diisopropyl carbonate, 2,5-dimethyl-2,5-di(tertiary butyl peroxy) hexane, and tertiary butyl peroxy acetate. Tertiary butyl peroxy isopropyl carbonate is especially preferred as an organic peroxide catalyst for use in the invention.

When the organic peroxide catalyst is used conjointly with a known peroxide containing a benzene ring, such as benzoyl peroxide, tertiary butyl perbenzoate, dicumyl peroxide or tertiary butyl cumyl peroxide, the resulting copolymer is heavily colored. Accordingly, the organic peroxide catalyst used in this invention is limited to those which do not contain a benzene ring.

The amount of the azo-type catalyst which is suitably used ranges from about 0.01 to 0.5% by weight based on the weight of the monomers, and the amount of the organic peroxide catalyst ranges from about 0.005 to 0.2% by weight based on the weight of the monomers.

The polymerization is carried out at a temperature of about 90° to 110°C until the conversion of the monomers reaches 70%. This is to prevent the organic peroxide catalyst from participating in the polymerization at the initial stage of the polymerization. After the conversion of the monomers has reached 70%, the polymerization should be carried out at a temperature of about 110° to 140°C. Furthermore, it is most preferred to add the organic peroxide catalyst when the conversion of the monomers has exceeded 70%.

Since the reactivity of acrylonitrile is lower than that of the aromatic vinyl compound and the acrylonitrile is partially soluble in water, it is the practice in this invention to initiate the polymerization while adjusting the amount of acrylonitrile added to about 1.4 to 1.6 times the weight of the final acrylonitrile content, and add the aromatic vinyl compound continuously or incrementally after the polymerization has proceeded to a certain extent. Specifically, at the time of charging the monomers, the ratio of the acrylonitrile to the aromatic vinyl compound is adjusted to about 30 to 50 : 70 to 50 (parts by weight), then the aromatic vinyl compound is further added, and finally this ratio is adjusted to about 20 to 35 : 80 to 65 (parts by weight). As the polymerization progresses, the viscosity of the dispersion increases, and dispersion becomes unstable. As a result the dispersion sometimes tends to form agglomerates. When the polymerization is performed while adding the aromatic vinyl compound incrementally at a temperature of about 90°C or higher, a copolymer of acrylonitrile and the aromatic vinyl compound can be obtained with good dispersibility. The incremental addition of the aromatic vinyl compound at a temperature lower than 90°C is not desirable since an increase in the viscosity of the dispersion occurs, and this results in the formation of agglomerates.

Suitable aromatic vinyl compounds which can be used in this invention include, for example, styrene, o-methylstyrene, m-methylstyrene, p-methylstyrene, and α-methylstyrene.

The suspension polymerization of this invention is usually conducted employing a dispersing agent and the dispersing agent which can be suitably employed are conventional dispersing agents usually employed in suspension polymerizations. For example, tri-calcium phosphate, tri-sodium phosphate, sodium phosphate, calcium chloride, or di-sodium phosphate can be suitably used as dispersion agents.

A molecular weight adjuster can also be used in the practice of the process of this invention. Examples of suitable molecular weight adjusters are tertiary dodecyl mercaptan, normal dodecyl mercaptan, an unsaturated dimer of α-methylstyrene, trichloroethylene, and terpinolene.

The copolymer produced by the process of this invention has a color value of B or better, a haze of not more than 0.5%, a softening point of at least 100°C, and a size distribution such that the proportion of particles remaining on a 32-mesh sieve is not more than 1%.

The following Examples and Comparative Examples illustrate the present invention. The various properties of the copolymer were measured in accordance with the following methods. The haze is a measure of the transparency, and the softening point is a measure of the heat distortion temperature. The color and haze were measured after pelletizing the copolymer and molding the pellets at 220°C.

| Color Evaluation Standard (visual evaluation of a molded step plate) | |
| --- | --- |
| Grade | |
| A: | very slightly yellow |
| B: | slightly yellow |
| C: | light yellow |
| D: | yellow |
| E: | slightly dark yellow |
| F: | deep yellow |

Haze

The haze of a 2 mm part of a step plate obtained by injection molding was measured in accordance with ASTM-D-1003. The molding machine used was a 2-ounce in-line screw (SJ-45A) (the product of Meiki Seisakusho Co. Ltd.).

Softening Point

A sample was pelletized using a 40 mm open vent extruder (the product of Toshiba Kikai Kabushiki Kaisha), and the softening point of the pellets was measured in accordance with JIS-K-6870.

Particle Distribution

Particles which were retained on a 32-mesh Tyler screen were weighed, and their percentage based on the total amount of the sample was determined.

Unreacted Monomer

The amount of the remaining unreacted monomers using dry beads of the copolymer product as a sample was measured by gaschromatography.

Tensile Strength

A test piece was prepared by molding on a 2-ounce in-line screw (8J-45A) (the product of Meiki Seisakusho Co. Ltd.), and the tensile strength of the molding was measured in accordance with ASTM D-638.

Acrylonitrile Content

The polymerized acrylonitrile content (hereinafter referred to as P.AN) of the resulting copolymer was measured using a CHN Corder (the product of Yanagimoto Seisakusho).

EXAMPLE 1

A 200 l autoclave was charged with 100 kg of pure water and 500 g of tri-calcium phosphate, and the mixture were stirred at 100 rpm. Then, 34.5 kg of styrene, 19.5 kg of acrylonitrile, 39 g of ACHN, and 156 g of tertiary dodecyl mercaptan were added, after which the mixture was stirred by bubbling nitrogen gas through the mixture for 15 minutes, and the autoclave was sealed. The temperature of the reaction system was increased, and when the temperature reached 95°C, a mixture of 23 kg of styrene monomer, 39 g of ACHN and 78 g of tertiary dodecyl mercaptan was continuously added at a rate of 3.84 kg/hour. The reaction mixture was maintained under these conditions at 95°C for 5 hours, and then, at 120°C for 2.5 hours.

After 30 minutes had elapsed after the temperature became 120°C, 39 g of ditertiary butyl peroxide was added. In accordance with conventional procedures, the product was neutralized, dehydrated, and dried.

The results obtained are shown in Table 1.

EXAMPLE 2

Example 1 was repeated except that all of the ditertiary butyl peroxide was added at the initial stage of the polymerization. When the temperature of the polymerization system was increased to 120°C, the conversion of the monomers was 80%. The results obtained are shown in Table 1.

EXAMPLE 3

Example 1 was repeated except that ACHN was added at the initial stage and at the time of adding a fresh supply of styrene the catalyst was changed to 1,1'-azobiscycloheptanitrile, and the polymerization cycle was changed to 5 hours at 92°C, and 2 hours at 125°C. The conversion of the monomers was 82% when the temperature of the polymerization system was increased to 125°C.

The results obtained are shown in Table 1.

COMPARATIVE EXAMPLE 1

Example 1 was repeated except that ditertiary butyl peroxide was not added. The results obtained are shown in Table 1.

COMPARATIVE EXAMPLE 2

Example 1 was repeated except that tertiary butyl peroxybenzoate was added instead of the ditertiary butyl peroxide. The results obtained are shown in Table 1.

COMPARATIVE EXAMPLE 3

Example 1 was repeated except that instead of using ACHN, the polymerization was performed for 5 hours at 105°C and then for 2.5 hours at 120°C using only ditertiary butyl peroxide. In addition, the additional monomers were fed after the temperature had increased to 105°C (conversion 75%). The results obtained are shown in Table 1.

COMPARATIVE EXAMPLE 4

Example 1 was repeated except as noted below. Azobisisobutyronitrile was used instead of ACHN, and the polymerization was performed for 7 hours at 60°C, and then for 2.5 hours at 120°C. The additional monomers were fed to the polymerization reaction system one hour after the temperature had increased to 60°C. Tertiary butyl peroxy acetate was added 30 minutes after the temperature had increased to 120°C (conversion 66%). The results obtained are shown in Table 1.

EXAMPLE 4

Example 1 was repeated except as noted below. 29.2 kg of styrene, 23.8 kg of acrylonitrile, 30 g of ACHN and 20 g of 1,1'-azobiscycloheptanitrile were charged, and when the temperature became 90°C, a mixture of 25 kg of styrene monomer, 20 g of ACHN, 20 g of 1,1'-azobiscycloheptanitrile and 78 g of tertiary dodecyl mercaptan was added at a rate of 4.17 kg/hour. Thirty minutes after the temperature had increased to 120°C (when the conversion became 71%), 20 g of tertiary butyl peroxy isopropyl carbonate and 20 g of ditertiary butyl peroxide were added. The results obtained are shown in Table 1.

COMPARATIVE EXAMPLE 5

Example 4 was repeated except that 40 g of tertiary butyl peroxy benzoate was added instead of 20 g of tertiary butyl peroxy isopropyl carbonate and 20 g of ditertiary butyl peroxide, 30 minutes after the temperature became 120°C (when the conversion reached 70%). The results obtained are shown in Table 1.

COMPARATIVE EXAMPLE 6

Example 4 was repeated except as noted below. Instead of ACHN and 1,1'-azobiscycloheptanitrile, the same amount of azobisisobutyronitrile was added, and the polymerization was performed for 7 hours at 60°C and 1 hour after the temperature had increased to 60°C, styrene was added incrementally at a rate of 3.57 kg/hour. After performing the polymerization for 7 hours at 60°C, the polymerization was further carried out for 2.5 hours at 120°C. 30 minutes after the polymerization temperature had increased to 120°C (when the conversion reached 65%), 20 g of tertiary butyl peroxy isopropyl carbonate and 20 g of ditertiary butyl peroxide were added. The results obtained are shown in Table 1.

EXAMPLE 5

A 200 l autoclave was charged with 100 kg of pure water and 500 g of tri-calcium phosphate, and the mixture was stirred at 100 rpm. Then, 29.2 kg of styrene, 23.8 kg of acrylonitrile, 40 g of ACHN and 430 g of an unsaturated dimer of α-methylsytrene were added, after which the mixture was stirred by bubbling nitrogen gas through the mixture for 15 minutes and the autoclave was sealed. When the temperature was increased, and reached 90°C, a mixture of 26 kg of styrene monomer, 40 g of ACHN and 30.0 g of an unsaturated dimer of α-methylstyrene was further added continuously at a rate of 4.35 kg/hour. The reaction mixture was maintained under these conditions at 90°C for 5 hours, and then at 120°C for 2.5 hours. 30 minutes after the temperature had increased to 120°C, 12 g of tertiary butyl peroxy isopropyl carbonate was added. The product was recovered in accordance with conventional customary procedures. The results obtained are shown in Table 1.

EXAMPLE 6

Example 5 was repeated except that 40 g of 2,2'-azobis(2-methoxycarbonylpropane) was added instead of ACHN added at the initial stage of polymerization and also as the additional monomer, and also 12 g of tertiary butyl peroxyacetate was used instead of the tertiary butyl peroxy isopropyl carbonate added 30 minutes after the temperature had increased to 120°C. The results obtained are shown in Table 1.

Table 1

| Properties | 1 | 2 | 3 | Examples 4 | 5 | 6 |
|---|---|---|---|---|---|---|
| Unreacted Monomers (%) | 0.7 | 0.6 | 0.6 | 0.5 | 0.4 | 0.6 |
| Color | A | A | A | B | B | B |
| Haze (%) | 0.45 | 0.43 | 0.47 | 0.50 | 0.50 | 0.49 |
| Softening Point(°C) | 100 | 101 | 101 | 103 | 103 | 102 |
| Particles Larger Than 32 Mesh (%) | 0.5 | 0.5 | 0.5 | 1.0 | 0.8 | 1.0 |
| Tensile Strength (kg/mm$^2$) | 6.7 | 6.7 | 6.6 | 7.5 | 7.4 | 7.4 |
| P. AN | 25.1 | 25.0 | 24.9 | 29.7 | 29.8 | 29.9 |
| Unreacted Monomers (%) | 3.5* | 1.1* | 0.7 | 1.0* | 0.9* | 0.7 |
| Color | B | E* | D* | B | F* | D* |
| Haze (%) | 0.50 | 0.70* | 0.60* | 3.0* | 1.2* | 3.5* |
| Softening Point (°C) | 88* | 94* | 100 | 95* | 95* | 100 |
| Particles Larger Than 32 Mesh (%) | 0.6 | 0.6 | 0.6 | 30.0* | 1.0 | 40.0* |
| Tensile Strength (kg/mm$^2$) | 6.7 | 6.3 | 6.4 | 6.7 | 7.4 | 7.4 |
| P. AN | 24.9 | 24.8 | 29.7 | 29.9 | 29.8 | 29.9 |
| Remarks | Beads turned yellow | Beads turned slightly yellow | | 10% of the beads retained on 100 mesh as agglomerates | Beads turned yellow | Contained 15% of particles larger than 10 mesh |

Asterisk indicates unfavorable results.

While the invention has been described in detail and with reference to specific embodiments thereof, it will be apparent to one skilled in the art that various changes and modifications can be made therein without departing from the spirit and scope thereof.

What is claimed is:

1. A process for preparing a copolymer of acrylonitrile and an aromatic vinyl compound comprising suspension polymerizing acrylonitrile and an aromatic vinyl compound chosen from the group consisting of styrene, o-methylstyrene, m-methylstyrene, p-methylstyrene and α-methylstyrene in an initial weight ratio of acrylonitrile to vinyl compound of 30–50: 70–50 which is during the process adjusted to a ratio of 20–35: 80–65 by the addition of vinyl compound, in the presence of at least one azo catalyst selected from the group consisting of 1,1'-azobiscyclohexanitrile, 1,1'-azobiscycloheptanitrile, 2,2'-azobis(2-nitropropane), 2,2'-azobis-(2-thiocyanopropane) and 2,2'-azobis(2-methoxycarbonyl propane) and at least one peroxide catalyst selected from the group consisting of ditertiary butyl peroxide, 2,5-dimethyl-2,5-di(tertiary butyl peroxy) hexane, tertiary butyl peroxy acetate and tertiary butyl peroxy isopropyl carbonate in an amount of catalyst of about 0.01 to 0.5% by weight, and and about 0.005 to 0.2% by weight, respectively, based on the weight of the monomers, and maintaining the temperature at a first level of about 90° to 110°C until the conversion of the monomers reaches 70%, and then, increasing the temperature to a second level in excess of said first level in the range of about 110° to 140°C until completion of the polymerization.

2. The process of claim 1, wherein said azo catalyst is 1,1'-azobiscyclohexanitrile or 1,1'-azobiscycloheptanitrile, and said peroxide catalyst is tertiary butyl peroxy isopropyl carbonate.

3. The process of claim 1, wherein said peroxide catalyst is added when the conversion of monomers has reached 70%.

4. The process of claim 1, wherein a dispersing agent selected from the group consisting of tricalcium phosphate, trisodium phosphate, sodium phosphate, calcium chloride or disodium phosphate is present in said process as a dispersing agent.

5. The process of claim 1, wherein a compound selected from the group consisting of tertiary dodecyl mercaptan, normal dodecyl mercaptan, an unsaturated dimer of α-methylstyrene, trichloroethylene and terpinolene is present as a molecular weight adjuster.

* * * * *